(12) United States Patent
Ueda

(10) Patent No.: US 9,436,020 B2
(45) Date of Patent: Sep. 6, 2016

(54) LUMINANCE ADJUSTMENT FILM AND ILLUMINATING DEVICE INCLUDING PHOTOTHERMAL CONVERSION MATERIAL

(71) Applicant: Empire Technology Development LLC, Wilmington, DE (US)

(72) Inventor: Masahiro Ueda, Kyoto (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/980,027

(22) PCT Filed: Dec. 5, 2012

(86) PCT No.: PCT/JP2012/007810
§ 371 (c)(1),
(2) Date: Jul. 16, 2013

(87) PCT Pub. No.: WO2014/087456
PCT Pub. Date: Jun. 12, 2014

(65) Prior Publication Data
US 2015/0316792 A1  Nov. 5, 2015

(51) Int. Cl.
| | | |
|---|---|---|
| *G02F 1/17* | (2006.01) | |
| *G02F 1/01* | (2006.01) | |
| *G02F 1/00* | (2006.01) | |
| *F21V 14/00* | (2006.01) | |
| *F21V 8/00* | (2006.01) | |
| *G02B 5/02* | (2006.01) | |

(52) U.S. Cl.
CPC ............ *G02F 1/0147* (2013.01); *F21V 14/00* (2013.01); *G02B 6/0033* (2013.01); *G02B 6/0065* (2013.01); *G02B 6/0068* (2013.01); *G02F 1/0063* (2013.01); *G02B 6/0058* (2013.01); *Y10T 29/49828* (2015.01)

(58) Field of Classification Search
CPC .... G02B 5/02; G02B 5/0263; G02B 6/0033; G02B 6/0065; G02B 6/068; G02F 1/009; G02F 1/1335; G02F 1/0147; G02F 1/0063; F21V 14/00
See application file for complete search history.

(56) References Cited

U.S. PATENT DOCUMENTS

| | | | | |
|---|---|---|---|---|
| 4,952,035 | A * | 8/1990 | Yuasa | G02F 1/0147 359/241 |
| 5,208,630 | A * | 5/1993 | Goodbrand | G03G 9/0926 283/73 |
| 2010/0209715 | A1 | 8/2010 | Wang et al. | |

FOREIGN PATENT DOCUMENTS

| | | |
|---|---|---|
| EP | 0 450 908 B1 | 9/1994 |
| JP | H0191492 A | 4/1989 |

(Continued)

OTHER PUBLICATIONS

International Search Report and Written Opinion; International Application No. PCT/JP2012/007810, filed May 12, 2012; 5 pages.

(Continued)

*Primary Examiner* — Karabi Guharay
*Assistant Examiner* — Nathaniel Lee
(74) *Attorney, Agent, or Firm* — Turk IP Law, LLC

(57) ABSTRACT

Luminance adjustment films that include a photothermal conversion material which converts infrared light to heat wherein an intensity distribution of the infrared light reflects a luminance distribution of visible light; and at least one microcapsule containing a compound which selectively decreases luminance of the visible light in reaction to the heat are described.

27 Claims, 4 Drawing Sheets

(56) References Cited

FOREIGN PATENT DOCUMENTS

JP 06-87932 12/1994
JP 2007-21794 A 2/2007

OTHER PUBLICATIONS

Nobuyuki Kita, "The Progress of Plate Technology for Computer-To-Plate System," Journal of Printing Science and Technology, vol. 36, No. 2, pp. 97-104 (1999).

Schild, H.G., "Poly(N-isopropylacrylamide): experiment, theory and application," Progress in Polymer Science, vol. 17, Issue 2, pp. 163-249 (1992).

Microcapsule, http://www.chemitech.co.jp/capsule/index.html, 1997-2010 Chemitech Inc. [printed from internet Mar. 19, 2013], 4 pp.

http://tdl.libra.titech.ac.jp/z3950/gakuipdf/1717209/171720902. pdf), [printed from the internet Mar. 19, 2013], 38 pp.

* cited by examiner

LUMINANCE ADJUSTMENT FILM AND ILLUMINATING DEVICE INCLUDING PHOTOTHERMAL CONVERSION MATERIAL

CROSS-REFERENCE TO RELATED APPLICATION

This application is the U.S. National Phase under 35 U.S.C. §371 of International Application No. PCT/JP2012/007810, filed Dec. 5, 2012, the contents of which are herein incorporated by reference in its entirety.

BACKGROUND

Laser emitting diodes have come into widespread usage as a result of their advantages, which include their small size, long life, low energy consumption, and low heat generation. Set against this background, there are high expectations for illuminating devices such as those using laser emitting diodes capable of emitting visible light having a uniform luminance distribution throughout a large display area. However, conventional illuminating devices are not necessarily satisfactory due to their unevenness in luminance distribution.

SUMMARY

In one aspect, a luminance adjustment film is described comprising: a photothermal conversion material which converts infrared light to heat wherein an intensity distribution of the infrared light reflects a luminance distribution of visible light; and at least one microcapsule containing a compound which selectively decreases luminance of the visible light in reaction to the heat.

In a second aspect, an illuminating device is described comprising: a visible light source configured to emit visible light; an infrared light source configured to emit infrared light having an intensity distribution which reflects a luminance distribution of the visible light; and a luminance adjustment film including a photothermal conversion material which converts the infrared light to heat and at least one microcapsule containing a compound which selectively decreases luminance of the visible light in reaction to the heat.

In a third aspect, a method of manufacturing a luminance adjustment film is described, the method comprising: providing a photothermal conversion material which converts infrared light to heat wherein an intensity distribution of the infrared light reflects a luminance distribution of visible light; providing at least one microcapsule containing a compound which selectively decreases luminance of the visible light in reaction to the heat; and combining the at least one microcapsule with the photothermal conversion material so as to produce the luminance adjustment film.

In a fourth aspect, a method of manufacturing an illuminating device is described, the method comprising: providing a visible light source configured to emit visible light;

providing an infrared light source configured to emit infrared light having an intensity distribution which reflects a luminance distribution of the visible light; providing a photothermal conversion material which converts the infrared light to heat; providing at least one microcapsule containing a compound which selectively decreases luminance of the visible light in reaction to the heat; combining the at least one microcapsule with the photothermal conversion material to produce a luminance adjustment film; and combining the luminance adjustment film with the visible light source and the infrared light source to produce the illuminating device.

In a fifth aspect, a method of adjusting luminance is described, the method comprising: emitting visible light from a visible light source; emitting infrared light from an infrared light source, the infrared light having an intensity distribution which reflects a luminance distribution of the visible light; converting the infrared light to heat by using a photothermal conversion material; and selectively decreasing luminance of the visible light in reaction to the heat by using a compound having a cloud point.

DETAILED DESCRIPTION

Figure 1:
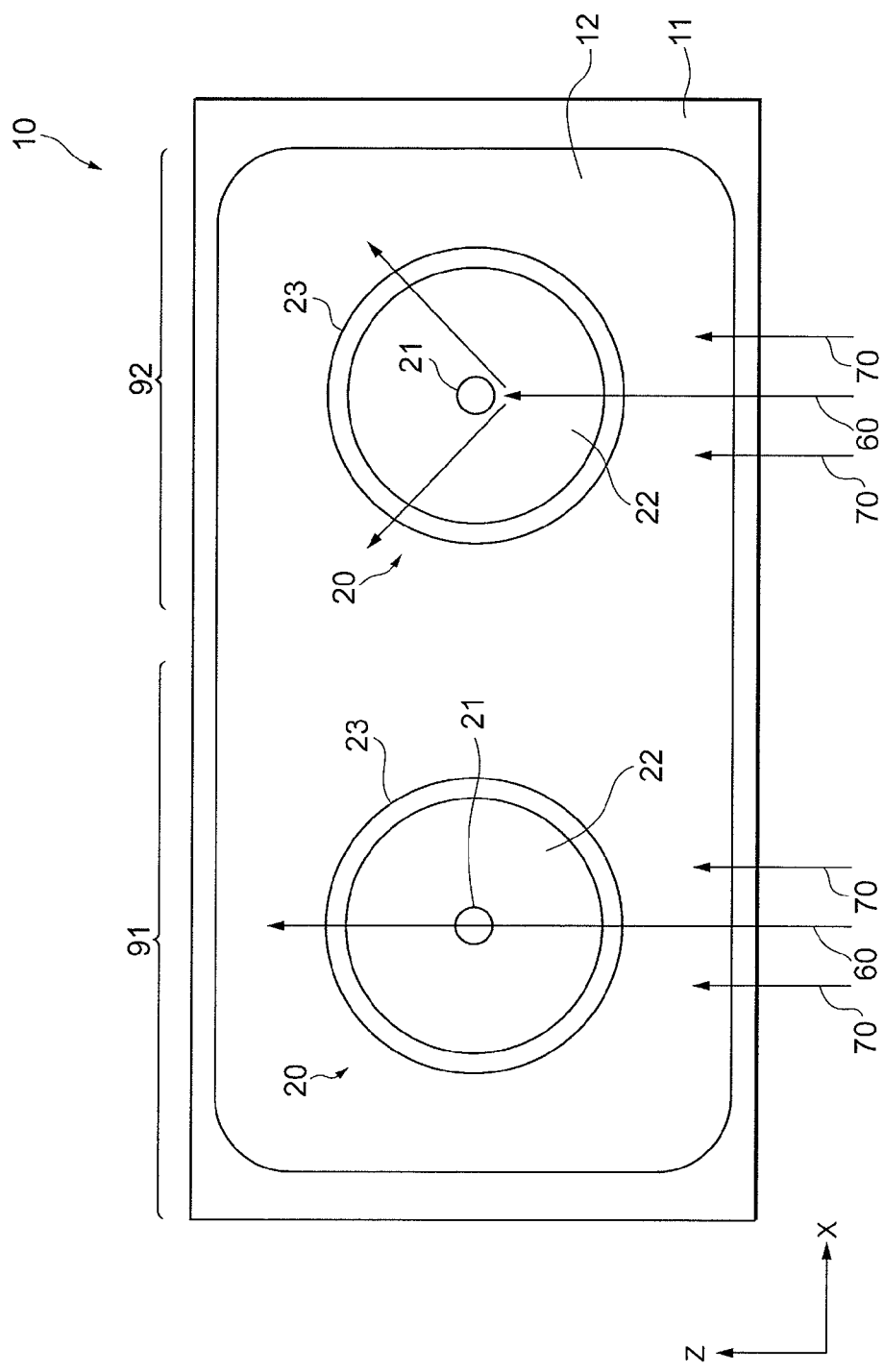
FIG. 1 shows a schematic view of a luminance adjustment film in accordance with an embodiment of the present disclosure.

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Luminance adjustment films and methods for their preparation and use are disclosed herein. The luminance adjustment films are effective to correct any unevenness in the intensity of visible light impacting on or passing through the luminance adjustment films. Various embodiments use separate coincident infrared light and visible light along with materials that have a cloud point temperature to effect scattering of visible light when its intensity is undesirably high, but allowing transmission when the intensity is at an acceptable level, thereby resulting in a more even intensity across the film.

FIG. 1 shows a schematic view of a luminance adjustment film 10 in accordance with an embodiment of the present disclosure. In FIG. 1, an X-axis is perpendicular to a thickness direction of the luminance adjustment film 10, and a Z-axis is parallel to the thickness direction of the luminance adjustment film 10. The luminance adjustment film 10 can include at least one transparent resin 11. The transparent resin 11 can be substantially or fully transparent to visible light 60. The transparent resin 11 can be substantially or fully transparent to infrared light 70. The luminance adjustment film 10 can include at least one photothermal conversion material 12 and at least one microcapsule 20 containing at least a first compound 21 having a first cloud point temperature. The microcapsule 20 can further include at least one solvent 22. Heat produced by infrared light 70 illumination of the photothermal conversion material 12 causes the production of heat. Once the heat causes the local temperature of the luminance adjustment film to exceed the cloud point temperature, the microcapsules 20 become cloudy, scattering any visible light 60, thereby correcting any unevenness in the intensity of the visible light 60.

In some embodiments, visible light 60 and infrared light 70 are substantially or fully directed coincident on the luminance adjustment film 10. The intensity of the infrared light 70 can be correlated with the intensity of the visible light 60, such that a more intense infrared light 70 can be directed with a more intense visible light 60. Use of only visible light 60 may not always allow absorption of energy by the photothermal conversion material 12. By using separate infrared light 70 and visible light 60 inputs, design of an effective system for correcting any unevenness in the intensity of the visible light 60 is greatly facilitated.

The transparent resin 11 can generally be any resin substantially or fully transparent to visible light. Specific examples of resins include polyethylene, polypropylene, cyclo olefin polymer, polystyrene, polyacrylonitrile, polymethyl methacrylate, polyamide, polycarbonate, polyethylene terephthalate, polybutylene terephthalate, polyethylene naphthalene, triacetyl cellulose, and combinations thereof. In some cases, the transparent resin 11 can have a refractive index that is similar or identical to the refractive index of the microcapsule 20.

The luminance adjustment film 10 can include at least one photothermal conversion material 12. In some embodiments, the luminance adjustment film can include 2, 3, 4, 5, 6, or more photothermal conversion materials (12A, 12B, 12C, and so on). The photothermal conversion material 12 can be distributed evenly or unevenly throughout the luminance adjustment film 10. Uneven distributions can be random, gradient, or other distributions. The photothermal conversion material 12 produces heat when illuminated with infrared light. If a local region of the luminance adjustment film 10 is contacted with infrared light illumination 70, the photothermal conversion material 12 releases heat and increases the local temperature within the local region.

The photothermal conversion material 12 can generally be any material suitable for producing heat when illuminated with infrared light. Specific examples of photothermal conversion materials 12 include phthalocyanine compounds, cyanine, dithiol metal complexes, naphthoquinone, anthraquinone dyes, aluminum, immonium dyes, and azo dyes. The wavelength range of the infrared light 70 may be selected so as to be consistent with the absorption wavelength of the photothermal conversion material 12. Depending on the photothermal conversion material 12, the wavelength range of the infrared light 70 may be about 800 nanometers to about 1100 nanometers. In some cases, a maximum intensity of the infrared light 70 may be determined such that among the compounds 21 in the luminance adjustment film 10, the one having the highest cloud point begins to be precipitated in the microcapsule 20 at the highest possible temperature.

The luminance adjustment film 10 can include at least one microcapsule 20 containing a first compound 21 having a first cloud point temperature. In some embodiments, the luminance adjustment film can include a plurality of the same microcapsule 20. In some embodiments, the luminance adjustment film can include two or more different microcapsules 20. In some embodiments, the luminance adjustment film 10 can include 2, 3, 4, 5, 6, or more different microcapsules 20 (20A, 20B, 20C, 20D, and so on). Each microcapsule can include one or more compounds, each having a same or different cloud point temperature. For example, a microcapsule 20 can include a first compound 21A having a first cloud point temperature $T_A$ and a second compound 21B having a second cloud point temperature $T_B$. Alternatively or additionally, different microcapsules can include different compounds (21A, 21B, 21C, 21D, and so on) having different cloud point temperatures. For example, a first microcapsule 20A can include a first compound 21A having a first cloud point temperature $T_A$, and a second microcapsule 20B can include a second compound 21B having a second cloud point temperature $T_B$. The first cloud point temperature $T_A$ and the second cloud point temperature $T_B$ can be the same or different. Typically, the various cloud point temperatures will be different. In a more complex example, a first microcapsule 20A can include a first compound 21A having a first cloud point temperature $T_A$, a second microcapsule 20B can include a second compound 21B having a second cloud point temperature $T_B$, a third microcapsule 20C can include a third compound 21C having a third cloud point temperature $T_C$, and so on.

Compounds 21 can be selected such that their various cloud point temperatures T are spaced apart. For example, in a system containing four different compounds 21A-21D, $T_A$ can be about 45 degrees Celsius, $T_B$ can be about 50 degrees Celsius, $T_C$ can be about 55 degrees Celsius, and $T_D$ can be about 60 degrees Celsius. In this example, when the microcapsule 20 reaches a temperature of 45 degrees Celsius, the compound 21A begins to be precipitated in the microcapsule 20, whereas the remaining compounds 21B, 21C, and 21D remain unchanged. Also, when the microcapsule 20 reaches a temperature of 50 degrees Celsius, both compounds 21A and 21B precipitate in the microcapsule 20, whereas the remaining compounds 21C and 21D remain unchanged. The extent of the turbidity increases or decreases substantially in proportion to the number of the compounds 21A, 21B, 21C, and 21D precipitated in the microcapsule 20. This allows the microcapsule 20 to gradually decrease the luminance of the visible light 60 so as to correct unevenness in the luminance distribution 61 of the visible light 60.

The compounds 21 having cloud point temperatures can generally be any material having a cloud point temperature. The compounds 21 remain transparent to visible light below the cloud point temperature, but precipitate or otherwise become cloudy or opaque to visible light at or above the cloud point temperature. The cloud point temperature can be a temperature at or above common room temperatures, such as at or above about 20 degrees Celsius. Examples of cloud point temperatures include about 20 degrees Celsius, about 25 degrees Celsius, about 30 degrees Celsius, about 35 degrees Celsius, about 40 degrees Celsius, about 45 degrees Celsius, about 50 degrees Celsius, about 55 degrees Celsius, about 60 degrees Celsius, about 65 degrees Celsius, about 70 degrees Celsius, about 75 degrees Celsius, about 80 degrees Celsius, about 85 degrees Celsius, about 90 degrees Celsius, about 95 degrees Celsius, about 100 degrees Celsius, and ranges between any two of these values (including endpoints). The minimum cloud point temperature may be slightly above room temperature. The maximum cloud point temperature may be 100 degrees Celsius. The cloud point temperature is ideally lower than a melting point temperature or degradation temperature of the luminance adjustment film or any of its components.

Specific examples of compounds 21 having cloud point temperatures (and their respective cloud point temperatures) include hydroxypropylcellulose, polyvinyl methyl ether, polyethylene oxide-polypropylene oxide copolymer, polyvinyl acetate partial hydrolysate, poly (N,N dimethyl aminoethyl acrylamide), and poly (N-isopropyl acrylamide) In the case where the compounds 21 are copolymers, their cloud point depends on their molecular weight and their ratio of components. Typically, cloud points of these compounds 21 listed above are between 30 degrees Celsius and 80 degrees Celsius.

The microcapsule 20 can be made of generally any one or more materials suitable to contain the one or more compounds having a cloud point temperature. The material can be substantially or fully transparent to visible light. The microcapsule 20 can be substantially or fully transparent to visible light 60 when below the cloud point temperature of any compound(s) contained within, but can be translucent or opaque to visible light 60 at or above the cloud point temperature of any compound(s) 21 contained within, thereby scattering any incident visible light. The materials may be mechanically tough, may chemically prevent a solution contained therein from leaking and may be dissolvable in a plastic resin. Examples of the materials include polycondensation resins, such as a melamine resin, a urea resin, a gelatin resin, a urethane resin, and a polyurea resin. The microcapsule 20 can include a capsular surface 23 defining the outer surface of the microcapsule.

The microcapsule 20 can further include at least one solvent 22. The solvent 22 can generally be any solvent suitable to dissolve the compound when below its cloud point temperature. The solvent 22 substantially or fully does not dissolve the compound when at or above its cloud point temperature. Example solvents 22 include water, high-boiling solvents, such as dimethylformamide, N-methylpyrrolidone, glycerin, polypropylene glycol, polyethyleneglycol, and combinations thereof. The solvent preferably does not leak or diffuse out of the microcapsule 20 or through the capsular surface 23.

The microcapsules 20 can be present in the luminance adjustment film 10 at generally any concentration. For example, a ratio of the plurality of microcapsules 20 to the luminance adjustment film 10 may be about 0.1% to about 90% by weight. Alternatively, the ratio of the plurality of microcapsules 20 to the luminance adjustment film 10 may be from about 5% to about 20% by weight.

The luminance adjustment film 10 can generally have any thickness. For example, the thickness can be about 1 micrometer to about 1 centimeter. Alternatively, the thickness can be about 5 micrometers to about 200 micrometers. Specific examples of thicknesses include about 1 micrometer, about 5 micrometers, about 10 micrometers, about 100 micrometers, about 200 micrometers, about 500 micrometers, about 1 millimeter, about 10 millimeters, and ranges between any two of these values (including endpoints).

The area of the luminance adjustment film 10 can generally be any area. Depending on the particular end use, for example, in the case where the luminance adjustment film 10 is used for a domestic display, an area of the luminance adjustment film 10 may be from about 1 square centimeter to about 25,000 square centimeters. Alternatively, the area can be from about 100 square centimeters to about 5,000 square centimeters. Specific examples of area include about 1 square centimeter, about 10 square centimeters, about 100 square centimeters, about 1,000 square centimeters, about 2,000 square centimeters, about 3,000 square centimeters, about 4,000 square centimeters, about 5,000 square centimeters, about 10,000 square centimeters, about 15,000 square centimeters, about 20,000 square centimeters, about 25,000 square centimeters, and ranges between any two of these values (including endpoints).

The shape of the luminance adjustment film 10 can generally be any shape. The shape can be regular or irregular. Regular shapes include squares, rectangles, triangles, hexagons, pentagons, octagons, circles, ovals, and so on.

Figure 2:
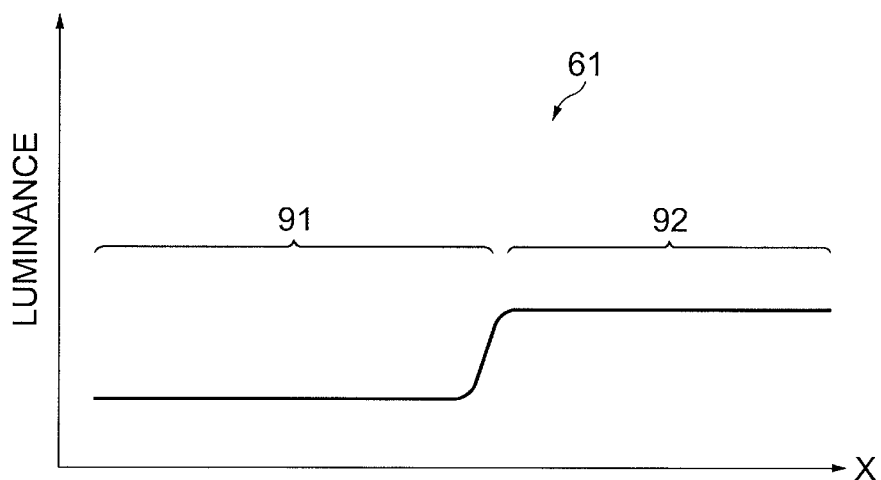
FIG. 2 shows a luminance distribution of visible light in accordance with an embodiment of the present disclosure.
Figure 3:
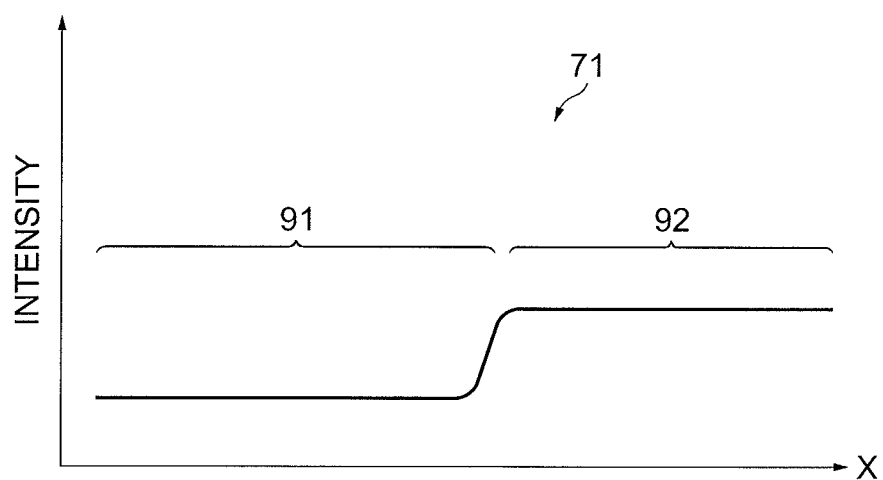
FIG. 3 shows an intensity distribution of infrared light in accordance with an embodiment of the present disclosure.

FIG. 2 shows a luminance distribution 61 of the visible light 60. FIG. 3 shows an intensity distribution 71 of the infrared light 70. As shown in FIGS. 2 and 3, the intensity distribution 71 may reflect the luminance distribution 61. In other words, the intensity of the infrared light 70 may increase or decrease substantially in proportion to the luminance of the visible light 60.

Due to the intensity distribution 71 reflecting the luminance distribution 61, when a luminance of the visible light 60 entering a region 92 of the luminance adjustment film 10 is greater than a luminance of the visible light 60 entering a region 91 of the luminance adjustment film 10, an intensity of the infrared light 70 entering the region 92 of the luminance adjustment film 10 is greater than an intensity of the infrared light 70 entering the region 91 of the luminance adjustment film 10.

Figure 4:
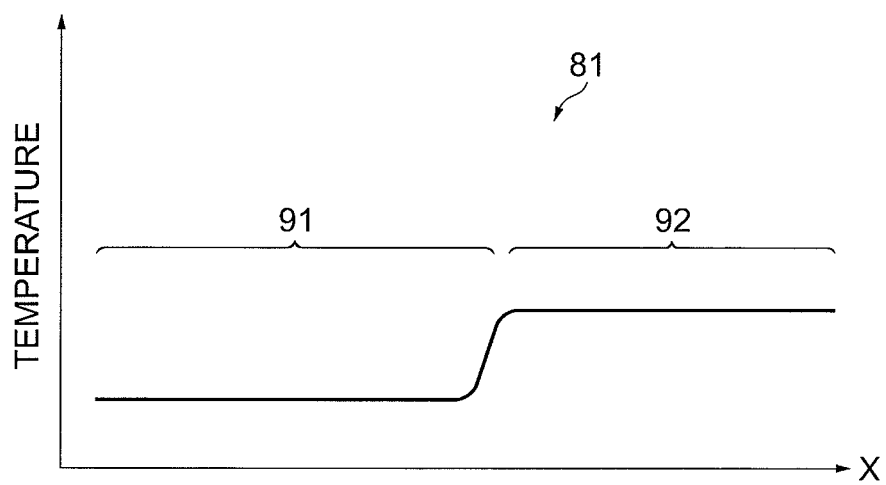
FIG. 4 shows a temperature distribution of a luminance adjustment film in accordance with an embodiment of the present disclosure.
Figure 5:
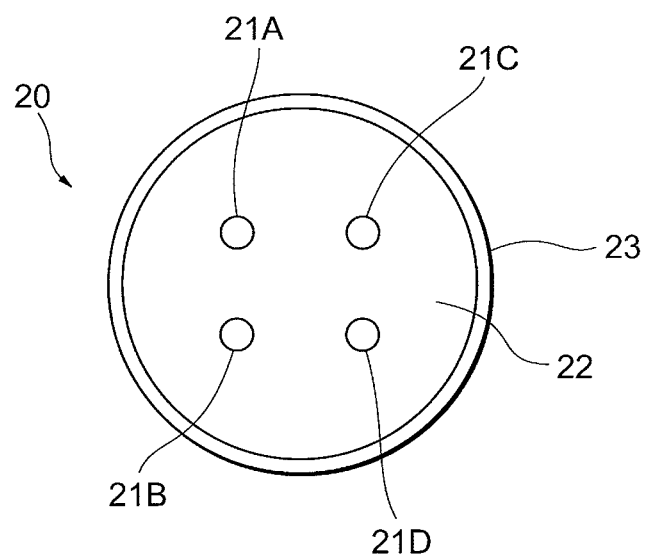
FIG. 5 shows a schematic view of a microcapsule in accordance with an embodiment of the present disclosure.

FIG. 4 shows a temperature distribution 81 of the luminance adjustment film 10. Due to the difference in the intensity of the infrared light 70 between the regions 91 and 92, the heat converted by the photothermal conversion material 12 from the infrared light 70 causes the temperature distribution 81 where a temperature of the region 92 is greater than that of the region 91. As a result, as shown in FIGS. 2 and 4, the temperature distribution 81 reflects the luminance distribution 61 of the visible light 60. In other words, the temperature of the luminance adjustment film 10 increases or decreases substantially in proportion to the luminance intensity of the visible light 60.

When the temperature of the compound 21 at the region 92 is greater than or equal to its cloud point at which the compound 21 begins to be precipitated in the microcapsule 20 in reaction to the heat, the compound 21 precipitated in the microcapsule 20 located at the region 92 selectively scatters the visible light 60 entering the region 92 so as to selectively decrease its luminance intensity.

On the other hand, when the temperature of the compound 21 at the region 91 is less than its cloud point at which the compound 21 begins to be precipitated in the microcapsule 20 in reaction to the heat, the visible light 60 entering the region 91 passes through the compound 21 in the microcapsule 20 located at the region 91.

This way, depending on a difference in the luminance intensity of the visible light 60 between the regions 91 and 92, the compound 21 selectively decreases the luminance of the visible light 60 entering the region 92 so as to correct any unevenness in the luminance distribution 61 of the visible light 60 through the reaction with the heat converted by the photothermal conversion material 12 from the infrared light 70.

Figure 6:
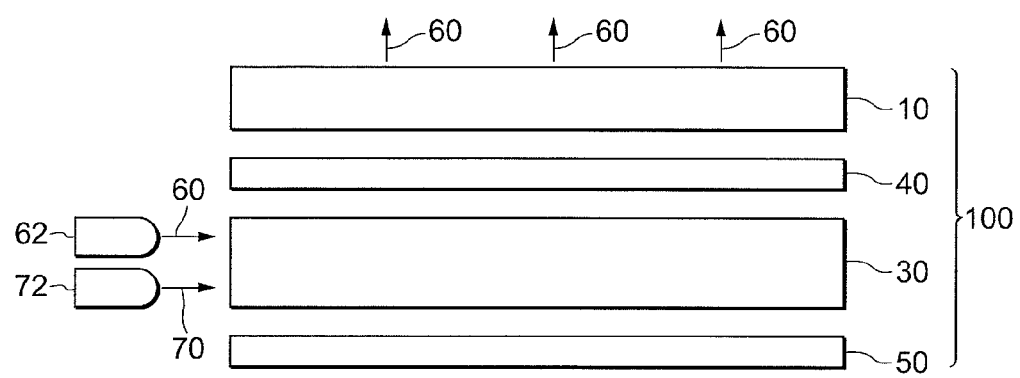
FIG. 6 shows a schematic view of an illuminating device in accordance with an embodiment of the present disclosure.

FIG. 6 shows a schematic view of an illuminating device 100 in accordance with an embodiment of the present disclosure. The illuminating device 100 may be provided with a visible light source 62 configured to emit the visible light 60, an infrared light source 72 configured to emit the infrared light 70, and the luminance adjustment film 10. The visible light source 62 and the infrared light source 72 may be closely apposed so that the infrared light source 72 can emit the infrared light 70 having the intensity distribution 71 which reflects the luminance distribution 61 of the visible light 60. The visible light source 62 may be an LED light source configured to emit the visible light 60. The infrared light source 72 may be a semiconductor laser, a YAG laser, or a xenon laser.

The illuminating device 100 may further be provided with a light guide plate 30, a scattering plate 40, and a reflective plate 50. The light guide plate 30 may be arranged to guide the visible light 60 and the infrared light 70 toward the luminance adjustment film 10. The visible light source 62 and the infrared light source 72 may be arranged to face one side of the light guide plate 30. The scattering plate 40 may be arranged to scatter the visible light 60 so as bring about the uniformity of the luminance distribution 61 of the visible light 60. The scattering plate 40 may be arranged between the luminance adjustment film 10 and the light guide plate 30. The reflective plate 50 may be arranged to reflect the visible light 60 and the infrared light 70 toward the luminance adjustment film 10. The reflective plate 50 may be arranged to receive the visible light 60 and the ultraviolet light 70 propagating from the light guide plate 30 in the opposite direction to the luminance adjustment film 10.

Additional embodiments include methods of manufacturing a luminance adjustment film. Methods can include providing a photothermal conversion material which converts infrared light to heat wherein an intensity distribution of the infrared light reflects a luminance distribution of visible light; providing at least one microcapsule containing a compound which selectively decreases luminance of the visible light in reaction to the heat; and combining the at least one microcapsule with the photothermal conversion material so as to produce the luminance adjustment film.

Additional embodiments include methods of manufacturing an illuminating device. The methods can include providing a visible light source configured to emit visible light; providing an infrared light source configured to emit infrared light having an intensity distribution which reflects a luminance distribution of the visible light; providing a photothermal conversion material which converts the infrared light to heat;

providing at least one microcapsule containing a compound which selectively decreases luminance of the visible light in reaction to the heat; combining the at least one microcapsule with the photothermal conversion material to produce a luminance adjustment film; and combining the luminance adjustment film with the visible light source and the infrared light source to produce the illuminating device.

An additional embodiment is directed towards methods of adjusting luminance. The methods can include emitting visible light from a visible light source; emitting infrared light from an infrared light source, the infrared light having an intensity distribution which reflects a luminance distribution of the visible light; converting the infrared light to heat by using a photothermal conversion material; and selectively decreasing luminance of the visible light in reaction to the heat by using a compound having a cloud point.

EXAMPLES

Example 1

Manufacturing a Luminance Adjustment Film

Using 3-hydroxypropylcellulose having a cloud point of 75 degrees Celsius and water as the compound 21 and the solvent 22 respectively, its concentration was adjusted to 20% by weight. After this, an interfacial polycondensation process was applied using a urea resin as the capsular surface 23, and the plurality of microcapsules 20 were manufactured. Next, using an immonium compound and a dissolved polycarbonate resin as the photothermal conversion material 12 and the transparent resin 11 respectively, the plurality of microcapsules 20 and the photothermal conversion material 12 were dissolved in the transparent resin 11 in such a manner that a ratio of the photothermal conversion material 12 to the luminance adjustment film 10 was adjusted to 0.5% by weight. After this, the transparent resin 11 was dried to produce the luminance adjustment film 10 having a thickness of 50 micrometers.

Example 2

Scattering Visible Light

Using a xenon lamp having an output power of 100 W, the infrared light 70 was provided from the xenon lamp to the luminance adjustment film 10 manufactured through Example 1, with a distance of 5 centimeters between the luminance adjustment film 10 and the xenon lamp at a room temperature of 20 degrees Celsius. Also, using an LED light source as the visible light source 62, the visible light 60 was provided to the luminance adjustment film 10. About five minutes after being irradiated, the compounds 21 began to be precipitated in the microcapsule 20, and then scattered the visible light 60 to correct unevenness in the luminance distribution 61 of the visible light 60.

Example 3

Luminance Adjustment Film Containing Multiple Cloud Point Compounds

A mixture of poly (N-isopropyl acrylamide), having a cloud point of about 40 degrees Celsius, and polyethylene oxide-polypropylene oxide copolymer, having a cloud point of about 50 degrees Celsius, is used for the compound 21. This mixture will enable the luminance adjustment film 10 to selectively scatter the visible light 60 so as to decrease the luminance of the visible light 60 in two steps (a first step being performed at 40 degrees Celsius and a second step being performed at 50 degrees Celsius), as if scattering ability increases as the temperature increases.

While the present disclosure has been described with respect to a limited number of embodiments, a person skilled in the art, having the benefit of this disclosure, would appreciate that other embodiments can be devised which do not depart from the scope of the present disclosure as disclosed herein. Accordingly, the scope of the invention should be limited only by the attached claims.

The invention claimed is:
1. An illuminating device comprising:
a visible light source configured to emit visible light;
an infrared light source configured to emit infrared light having an intensity distribution which is proportionally related to a luminance distribution of the visible light; and
a luminance adjustment film including a photothermal conversion material which converts the infrared light to heat and at least one microcapsule containing a compound which selectively decreases luminance of the visible light in reaction to the heat.

2. The illuminating device of claim 1, wherein the visible light source comprises an LED light source.

3. The illuminating device of claim 1, wherein the infrared light source comprises a semiconductor laser, a YAG laser, or a xenon laser.

4. The illuminating device of claim 1, wherein the heat causes a temperature distribution which reflects a luminance distribution of the visible light.

5. The illuminating device of claim 1, wherein the compound has a cloud point.

6. The illuminating device of claim 5, wherein the compound selectively scatters the visible light so as to selectively decrease the luminance of the visible light when a temperature of the compound is greater than or equal to the cloud point.

7. The illuminating device of claim 6, wherein the compound is precipitated in the at least one microcapsule so as to selectively scatter the visible light.

8. A method of manufacturing an illuminating device, the method comprising:
   providing a visible light source configured to emit visible light;
   providing an infrared light source configured to emit infrared light having an intensity distribution which reflects a luminance distribution of the visible light;
   providing a photothermal conversion material which converts the infrared light to heat;
   providing at least one microcapsule containing a compound which selectively decreases luminance of the visible light in reaction to the heat;
   combining the at least one microcapsule with the photothermal conversion material to produce a luminance adjustment film; and
   combining the luminance adjustment film with the visible light source and the infrared light source to produce the illuminating device.

9. The method of manufacturing an illuminating device of claim 8, wherein the compound has a cloud point.

10. The method of manufacturing an illuminating device of claim 9, wherein the visible light passes through the compound when a temperature of the compound is less than the cloud point.

11. The method of manufacturing an illuminating device of claim 8, wherein the at least one microcapsule contains a plurality of compounds each having different cloud points from one another.

12. The method of manufacturing an illuminating device of claim 8, wherein the at least one microcapsule contains a solvent in which the compound is dissolved.

13. The method of manufacturing an illuminating device of claim 12, wherein the solvent comprises dimethylformamide, N-methylpyrrolidone, glycerin, polypropylene glycol, or polyethyleneglycol.

14. The method of manufacturing an illuminating device of claim 12, wherein the solvent further comprises water.

15. The method of manufacturing an illuminating device of claim 8, wherein a thickness of the luminance adjustment film is from about 1 micrometer to about 1 centimeter.

16. The method of manufacturing an illuminating device of claim 8, wherein an area of the luminance adjustment film is from about 25 square centimeters to about 25,000 square centimeters.

17. The method of manufacturing an illuminating device of claim 8, wherein the at least one microcapsule comprises a plurality of microcapsules uniformly distributed in the luminance adjustment film.

18. The method of manufacturing an illuminating device of claim 17, wherein a ratio of the plurality of microcapsules to the luminance adjustment film is from about 0.1% to about 90% by weight.

19. A method of adjusting luminance, the method comprising:
   emitting visible light from a visible light source;
   emitting infrared light from an infrared light source, the infrared light having an intensity distribution which reflects a luminance distribution of the visible light;
   converting the infrared light to heat by using a photothermal conversion material; and
   selectively decreasing luminance of the visible light in reaction to the heat by providing at least one microcapsule containing a compound having a cloud point.

20. The method of adjusting luminance of claim 19, wherein the photothermal conversion material is selected from the group consisting of: phthalocyanine compounds, cyanine, dithiol metal complexes, naphthoquinone, anthraquinone dyes, aluminum, immonium dyes, and azo dyes.

21. The method of adjusting luminance of claim 19, wherein the compound is selected from the group consisting of: hydroxypropylcellulose, polyvinyl methyl ether, polyethylene oxide-polypropylene oxide copolymer, polyvinyl acetate partial hydrolysate, poly (N,N dimethyl aminoethyl acrylamide), and poly (N-isopropyl acrylamide).

22. The method of adjusting luminance of claim 19, further comprising a transparent resin in which the photothermal conversion material and the at least one microcapsule are contained.

23. The method of adjusting luminance of claim 22, wherein the transparent resin comprises polyethylene, polypropylene, cyclo olefin polymer, polystyrene, polyacrylonitrile, polymethyl methacrylate, polyamide, polycarbonate, polyethylene terephthalate, polybutylene terephthalate, polyethylene naphthalene, or triacetyl cellulose.

24. The method of adjusting luminance of claim 19, wherein the cloud point ranges about 20 degrees Celsius to 75 degrees Celsius.

25. The method of adjusting luminance of claim 19, wherein the cloud point ranges about 40 degrees Celsius to 60 degrees Celsius.

26. The method of adjusting luminance of claim 19, wherein the at least one microcapsule is coated with a polycondensation resin.

27. The method of adjusting luminance of claim 26, wherein the polycondensation resin is formed of a melamine resin, a urea resin, a gelatin resin, a urethane resin, or a polyurea resin.

* * * * *